(12) United States Patent
Jodha (10) Patent No.: US 12,139,228 B2
(45) Date of Patent: Nov. 12, 2024

(54) CARGO SECURING APPARATUS FOR A SCOOTER

(71) Applicant: Gunpal Singh Jodha, Kitchener (CA)

(72) Inventor: Gunpal Singh Jodha, Kitchener (CA)

( * ) Notice: Subject to any disclaimer, the term of this patent is extended or adjusted under 35 U.S.C. 154(b) by 0 days.

(21) Appl. No.: 17/816,658

(22) Filed: Aug. 1, 2022

(65) Prior Publication Data

US 2022/0371680 A1    Nov. 24, 2022

Related U.S. Application Data (60) Provisional application No. 63/362,980, filed on Apr. 14, 2022, provisional application No. 63/203,877, filed on Aug. 3, 2021.

(51) Int. Cl.
| | |
|---|---|
| *B62J 7/08* | (2006.01) |
| *B62J 11/05* | (2020.01) |
| *B62K 3/00* | (2006.01) |

(52) U.S. Cl.
CPC ............... *B62J 7/08* (2013.01); *B62J 11/05* (2020.02); *B62K 3/002* (2013.01)

(58) Field of Classification Search
CPC ..................................... B62J 7/08; B62J 11/05
See application file for complete search history.

(56) References Cited

U.S. PATENT DOCUMENTS

| | | | | |
|---|---|---|---|---|
| 1,459,093 | A * | 6/1923 | French ............... | B25B 5/003 |
| | | | | 269/156 |
| 2,613,952 | A * | 10/1952 | Lannon ............... | B62B 5/0083 |
| | | | | 280/DIG. 6 |
| 3,938,719 | A * | 2/1976 | Carlton ............... | B62J 7/02 |
| | | | | 224/438 |
| 7,931,176 | B1 * | 4/2011 | Wenom, Jr. ......... | B62J 25/06 |
| | | | | 224/452 |

* cited by examiner

*Primary Examiner* — Corey N Skurdal (57) ABSTRACT

Embodiments of a cargo securing apparatus for securing cargo placed on the deck of a scooter are described. The cargo securing apparatus comprises one or more mounting bodies disposed between the front wheel and operator so as to be in front of operator.

11 Claims, 9 Drawing Sheets

Position where the golf bag is placed

CARGO SECURING APPARATUS FOR A SCOOTER

TECHNICAL FIELD

The present disclosure relates to scooter accessories, and in particular to apparatuses for securing cargo to a scooter.

BACKGROUND

A scooter in the context of the disclosure is typically a two wheel transport means which has relatively small wheels (in comparison with a bicycle, for example), a deck which is arranged very close to the ground and on which an operator may stand, and a long steering column extending upward from the low mounted deck to position a handlebar at a height that it may be conveniently grasped by the standing operator. The steering column can be turned to steer the scooter in the required direction. Such a scooter may be operated entirely by an electric motor or some other power source or may require being propelled by a human during the initial start. The scooter may also be light-weight and foldable to allow for easy carrying.

People who use scooters and also want to carry cargo on the scooter have limited options. One option being to simply carry the cargo in a bag that they can carry on their shoulders, but this becomes risky if the cargo is heavy as it leads to increasing the height of the center of gravity. Another option available is to mount a basket on the handle bars of the scooter, and place the cargo in the basket. But this also has the problem of a high center of gravity, not to mention that the basket would rotate about the steering axis every time the scooter is steered, which presents additional risks. Another option is to have a hook that is mounted on the vertical steering column onto which the cargo can be hung, but this has the problem of instability as well as the cargo is simply hanging from the hook, so is prone to swaying on every turn.

What is desired is an efficient apparatus for securing cargo to a scooter, wherein the cargo is positioned at a low center of gravity on the scooter, for example, an apparatus which enables securement of cargo placed directly or indirectly on the deck of a scooter, wherein the cargo is prevented from sliding off the deck of the scooter during scooter operation, and wherein the cargo is secured from shifting or rotating about the steering axis when the scooter is steered.

SUMMARY OF PARTICULAR EMBODIMENTS

It will be appreciated by those skilled in the art that other variations of the embodiments described below may also be practiced without departing from the scope of the invention. Further note, these embodiments, and other embodiments of the present invention will become more fully apparent from a review of the description and claims which follow.

Securing cargo placed on the deck of a scooter can be accomplished by utilizing structural members of a scooter that do not move along with rotation of the steering column or front wheel or rear wheel. In most scooters these members are the deck and the joining column—the column that joins the deck to the steering column.

By attaching the cargo to one or both of these members using a cargo securing apparatus, the two objectives of securing cargo placed on the deck and preventing the cargo from rotating about the steering axis when the scooter is steered can be accomplished. Furthermore, the center of gravity of the scooter is lowered due to the lower position of the cargo making the scooter more stable.

In one embodiment described herein, the cargo securing apparatus for attaching the cargo to the joining column and/or the deck can also be removable, such that when the user is finished moving cargo, the cargo securing apparatus can be removed from the scooter. This is especially useful for scooters that have a steering column and/or joining column that needs to be folded towards the deck of the scooter to allow easy carrying, as the cargo securing apparatus then no longer hinders the folding operation.

In one embodiment of the present invention, the cargo securing apparatus may be positioned in front of the operator to allow the operator to be able to easily monitor the cargo.

In another embodiment of the present invention, the cargo securing apparatus may also attach with cargo holding objects depending on the nature of cargo being carried. For instance, if a person wants to carry groceries on their scooter, it may be beneficial to have the cargo securing apparatus attach to a basket that carries groceries. Similarly, if a person wants to just secure his or her bag on the deck of the scooter while travelling, the cargo securing apparatus may provide anchors for a fastener strap to secure the bag to the cargo securing apparatus.

In one embodiment, there is provided a cargo securing apparatus for use with a manual scooter or e-scooter, the apparatus comprising a mounting body, the mounting body having a first end and a second end, an at least one securement member disposed on the mounting body, the at least one securement member for removeably attaching the apparatus to the scooter, an at least one cargo attachment member disposed on the mounting body, the at least one cargo attachment member for removeably attaching cargo to the apparatus.

In another embodiment, there is provided a cargo securing apparatus for a scooter having a front wheel, a rear wheel, a deck, a steering column, a joining column connecting the deck to the steering column by a steering bearing, wherein the apparatus comprises one or more mounting bodies disposed between the front wheel and operator so as to be in front of operator, configured to mount to a stationary member, and wherein the stationary member is defined as a structural member of the scooter that does not move with the rotation of the steering column or the front or rear wheel.

A scooter so configured with the apparatus of the present invention may be easily used to carry small personal cargo such as groceries, school bags and other cargo that can be kept on the deck of the scooter, while still leaving enough space to allow the operator to comfortably ride on the deck of the scooter.

BRIEF DESCRIPTION OF THE SEVERAL VIEWS OF THE DRAWINGS

In the drawings, preferred embodiments of the invention are illustrated by way of example. It is to be expressly understood that the drawings are only for the purpose of illustration and as an aid to understanding and are not intended as a definition of the limits of the invention. The embodiments herein will be understood from the following description with reference to the drawings, in which.

DETAILED DESCRIPTION OF EMBODIMENTS

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. In particular, all terms used herein are used in accordance with their ordinary meanings unless the context or definition clearly indicates otherwise. Also, unless indicated otherwise except within the claims the use of "or" includes "and" and vice-versa. Non-limiting terms are not to be construed as limiting unless expressly stated or the context clearly indicates otherwise (for example, "including", "having", "characterized by" and "comprising" typically indicate "including without limitation"). Singular forms included in the claims such as "a", "an" and "the" include the plural reference unless expressly stated or the context clearly indicates otherwise. Further, the stated features and/or configurations or embodiments thereof the suggested intent may be applied as seen fit to certain operating conditions or environments by one experienced in the field of art. Further, as used herein the term "substantially" is intended to mean "considerable in extent" or "largely but not wholly that which is specified".

Figures 1A, 1B:
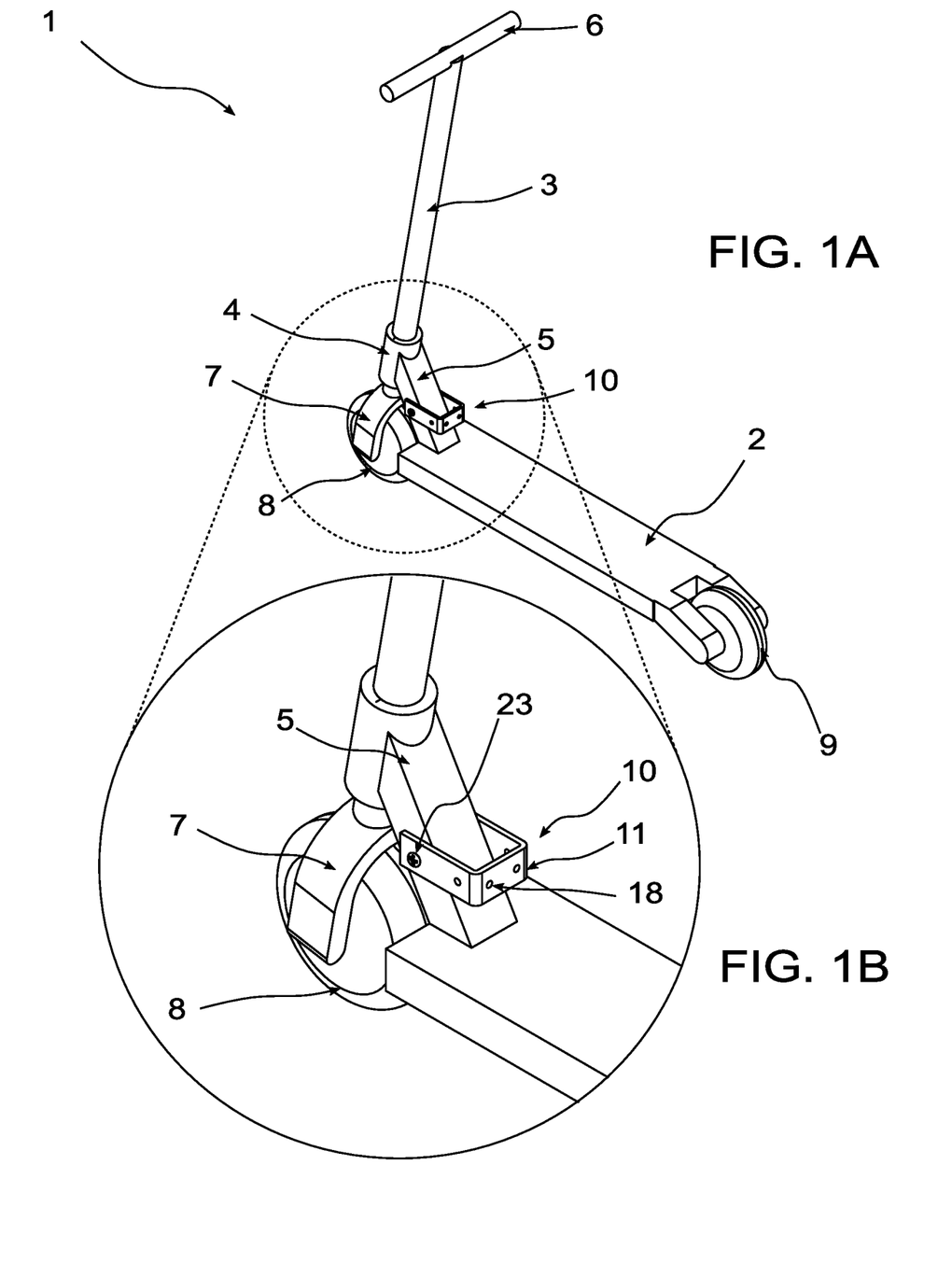
FIG. 1A illustrates a perspective view of a scooter having a first exemplary embodiment of the cargo securing apparatus according to the disclosure.
FIG. 1B illustrates a magnified view of a portion of FIG. 1A.

FIG. 1A illustrates a perspective view of a scooter having a first exemplary embodiment of the cargo securing apparatus according to the disclosure. The scooter 1 has a deck 2 upon which an operator can stand, which is substantially flat, and in top view extends substantially centrally between a rear wheel 9 of the scooter and a front wheel 8. The scooter 1 furthermore has a steering column 3 that connects a handlebar 6 of the scooter 1 to a wheel fork 7 so as to allow steering the front wheel 8 of the scooter 1. The scooter 1 furthermore has a joining column 5 connecting the deck 2 to the steering column 3 via at least one steering bearing 4 so as to allow the steering column 3 to be moveable about its longitudinal center axis. The deck 2 and joining column 5 may be immovably connected. The cargo securing apparatus 10 comprises of a mounting body 11 that is mounted to a stationary member, which in this embodiment is the joining column 5. A stationary member is defined as a structural member of the scooter 1 that does not move along with the rotation of the steering column 3 or the front wheel 8 or rear wheel 9.

FIG. 1B illustrates a magnified view of a portion of FIG. 1A. In the embodiment shown, the mounting body 11 has a rigid frame with a first and second end, with each end mounted to either side of the joining column 5, as a result the mounting body 11 is prevented from rotating sideways due to lateral forces such as from cargo when steering the scooter 1. The mounting between the mounting body 11 and the joining column 5 can be any type, such as immovable with respect to the joining column 5 or hinge mounted. Furthermore, the mounting can be permanent or removeable. In this example embodiment, the mounting is immovable and removeable as it is achieved by a screw fastener 23. As depicted the mounting body 11 is in the form of a "U" collar, but it can be of any shape that facilitates preventing lateral forces from rotating the mounting body 11. The mounting body 11 can be composed from any rigid and strong material, including but not limited to metal such as steel, cast iron or rigid non-metal. The mounting body 11 has a plurality of apertures (or holes) 18 using which cargo carrying objects such as baskets can be secured to the collar directly or using fasteners. Preferably, the cargo carrying object is foldable to allow easy carrying when dismounted from the scooter 1.

Figure 2:
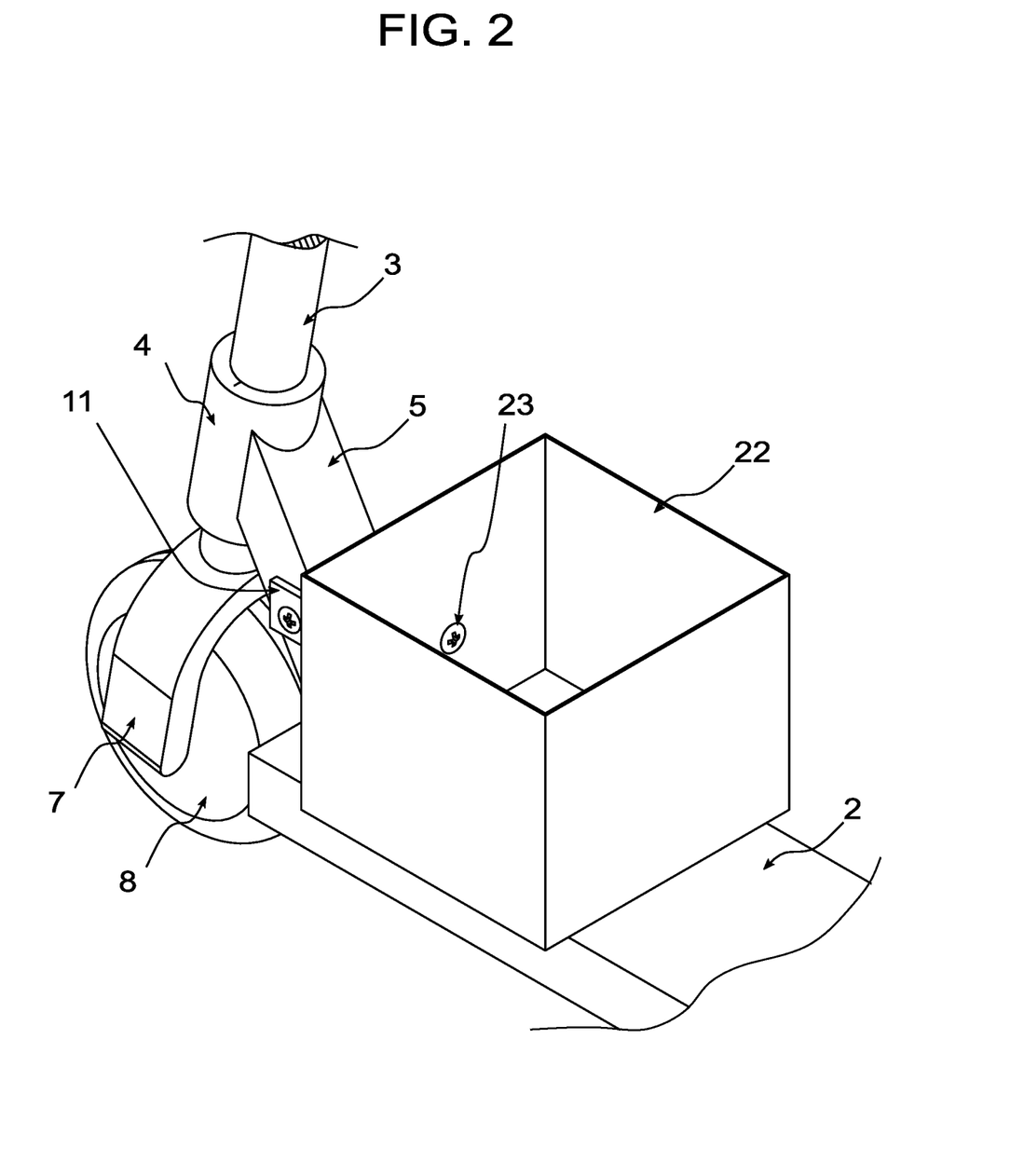
FIG. 2 illustrates a perspective view of a front portion of a scooter having a second exemplary embodiment of the cargo securing apparatus according to the disclosure.
Figure 3:
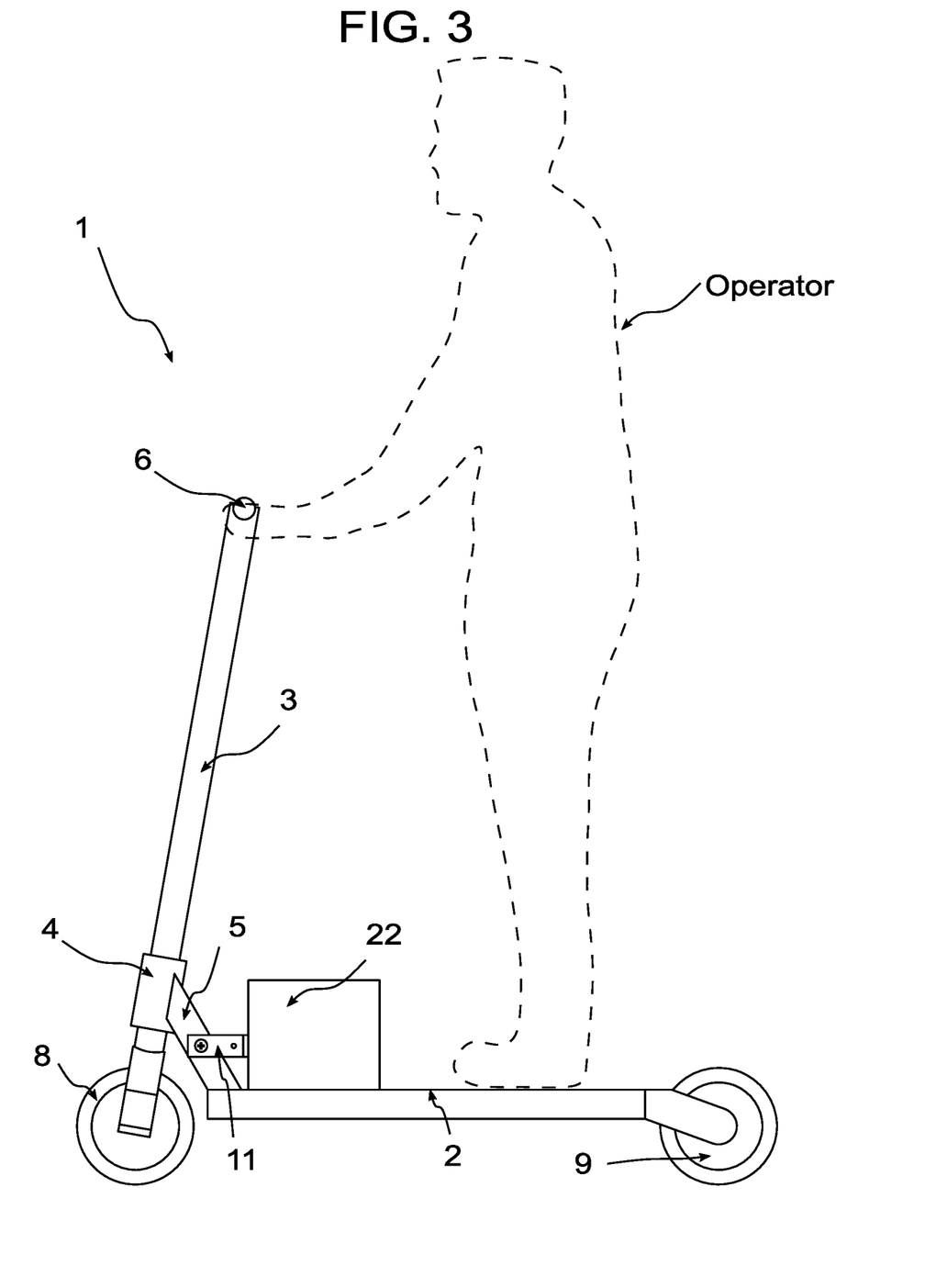
FIG. 3 illustrates an elevation view of a scooter having said second exemplary embodiment of the cargo securing apparatus according to the disclosure.

FIG. 2 shows a perspective view of a front portion of a scooter 1 having a second exemplary embodiment of the cargo securing apparatus 10 according to the disclosure. In this embodiment, a basket 22 that has been kept on the deck 2 has been fastened to the mounting body 11 using screws 23, but any method of fastening the basket 22 to the mounting body 11 can be utilized. The cargo can then be placed in the basket 22. During operation of the scooter 1, as seen in FIG. 3, the cargo stays secure as neither lateral nor longitudinal forces are able to push the cargo away from the deck 2 as cargo is in the basket that is secured.

Figure 4:
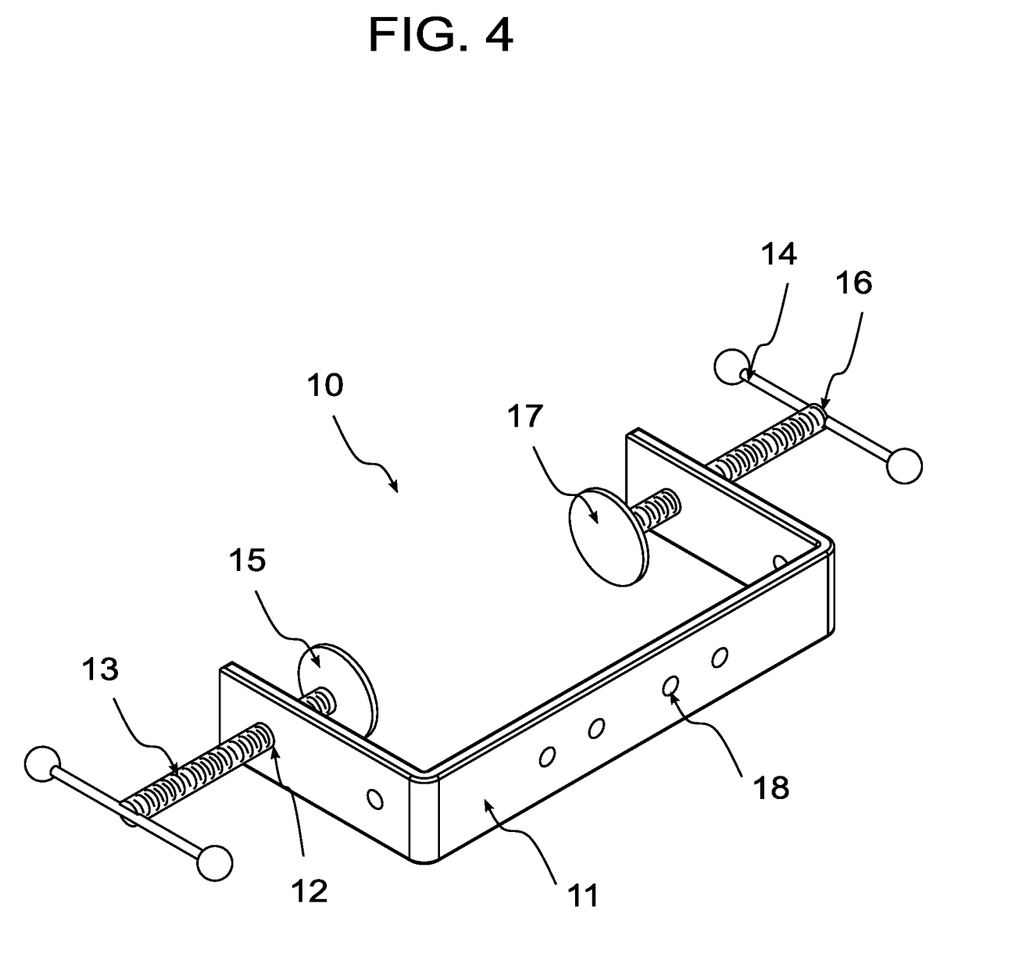
FIG. 4 illustrates a perspective view of the mounting body from a third exemplary embodiment of the cargo securing apparatus according to the disclosure.
Figure 5:
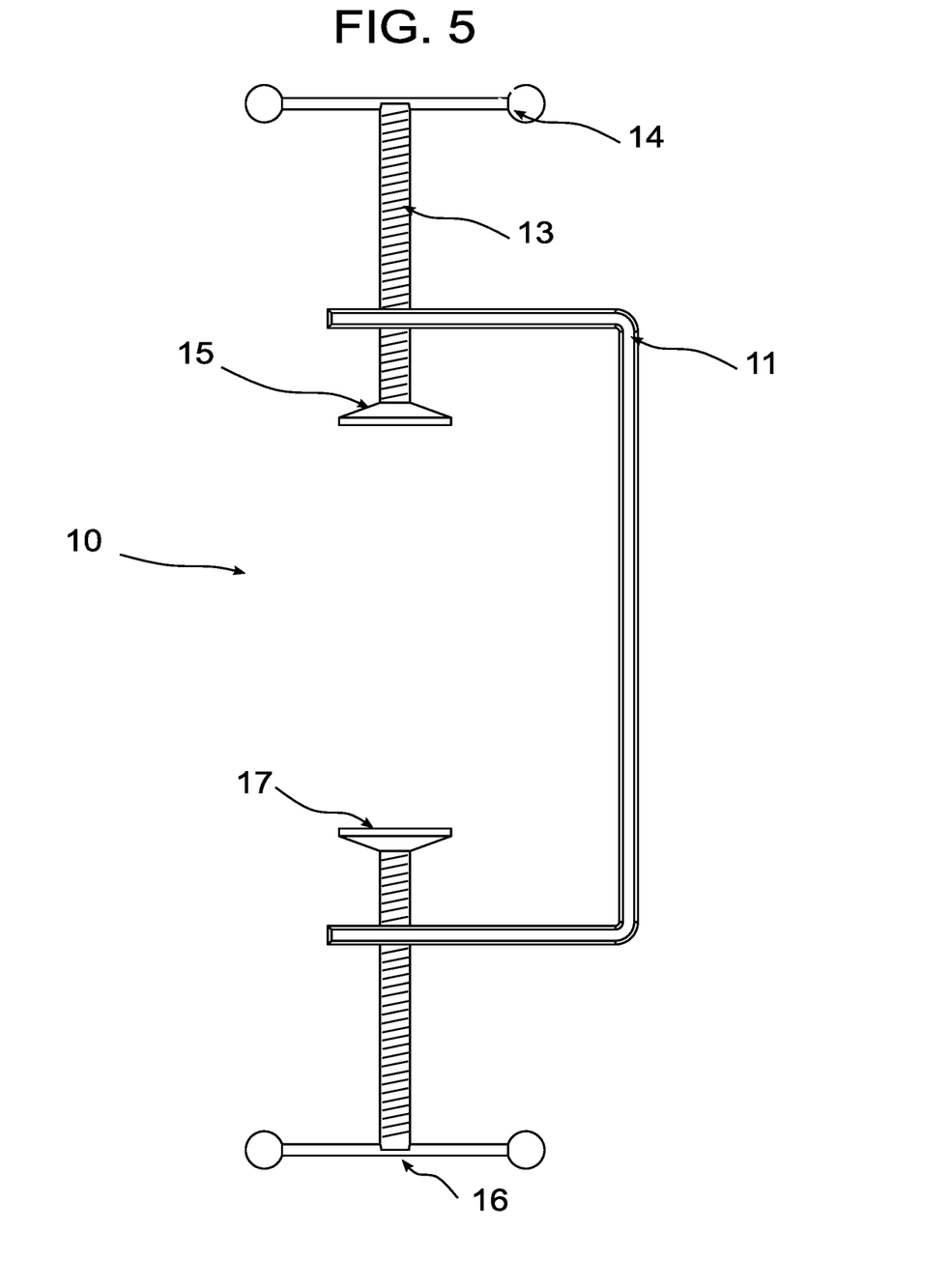
FIG. 5 illustrates a plan view of the mounting body from said third exemplary embodiment of the cargo securing apparatus according to the disclosure.

FIGS. 4 and 5 show a perspective view and plan view respectively of a third exemplary embodiment of the cargo securing apparatus 10 according to the disclosure. The mounting body 11 in this embodiment is removable and has a rigid frame with a first and second end, both provided with a threaded bore 12 and a threaded rod 13 telescopically received within each threaded bore 12. The threaded rods 13 have an object engaging end 15 with a high grip contact surface 17 and a turning end 16 which includes a lever 14 to help turn the threading rod 13. Preferably, the threaded bores 12 and threaded rods 13 may be designed to prevent vibration from loosening them, such as having a finer thread pitch or have a securing mechanism.

Figure 6:
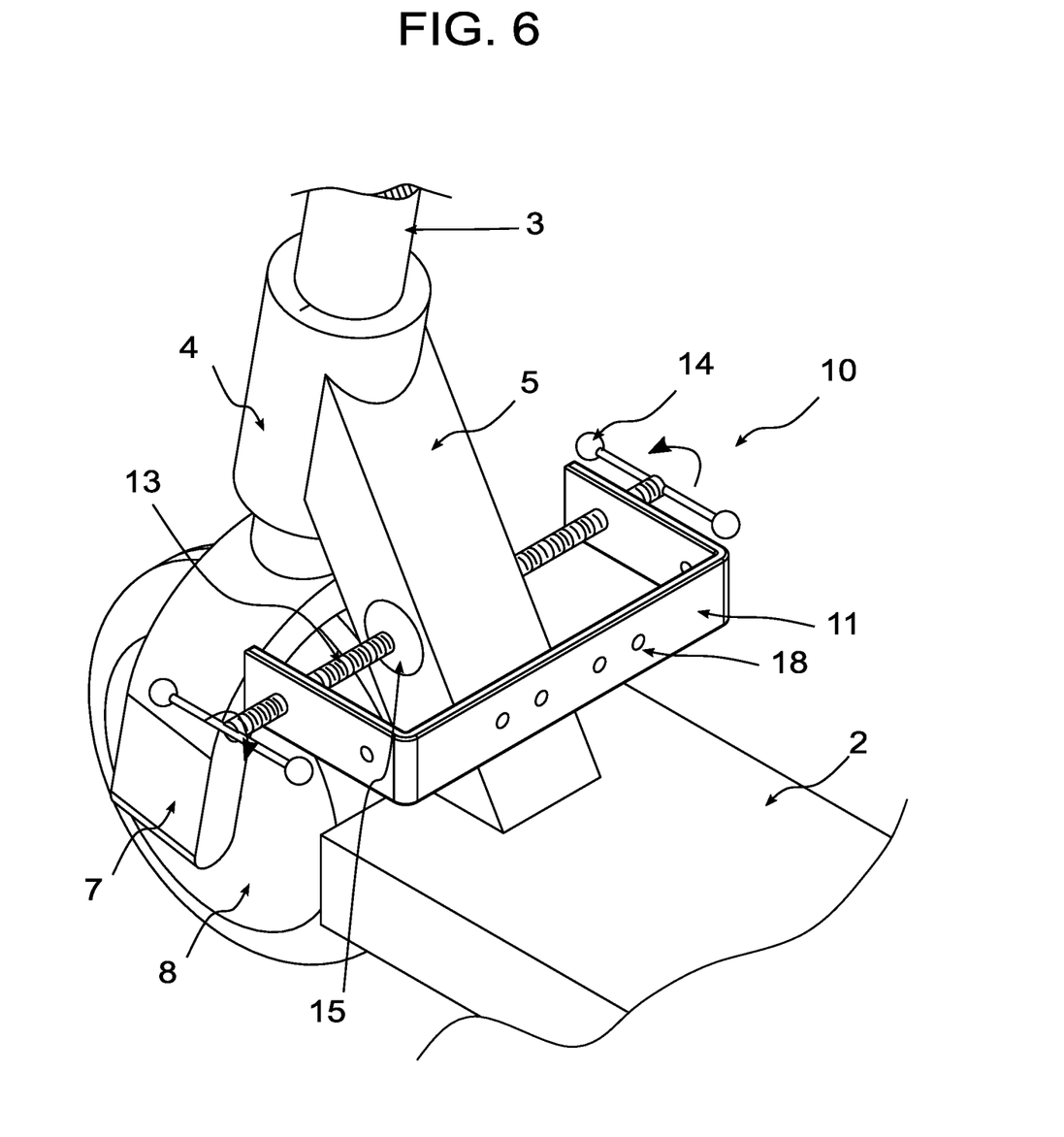
FIG. 6 illustrates a perspective view of a front portion of a scooter having said third exemplary embodiment of the cargo securing apparatus according to the disclosure.

FIG. 6 shows a perspective view of a front portion of a scooter 1 having said third exemplary embodiment of the cargo securing apparatus 10 according to the disclosure. The mounting body 11 is connected to the joining column 5 by rotating the threaded rods 13 using their levers 14 to allow their object engaging ends 15 to clamp the joining column 5 by forcibly pressing against it, similar to a C-clamp. This allows the mounting body 11 to be removed when needed by reversing the rotation of the threaded rods 13 in order to relieve the clamping force on the joining column 5. The material for the mounting body 11 can be a rigid and strong material that does not bend, such as cast iron as it is subject to reactionary outward forces. Preferably, as seen in FIG. 6, the joining column 5 has multiple planar surfaces so as to allow the threaded rods' 13 object engaging ends 15 good surface contact with the joining column 5. As the mounting body 11 is removeably mounted to the joining column 5, the mounting body 11 can be removed to allow normal operation of the scooter 1. This removable aspect can be particularly useful for scooters 1 whose steering column 3 folds to allow easy carrying of the scooter 1.

Figure 7:
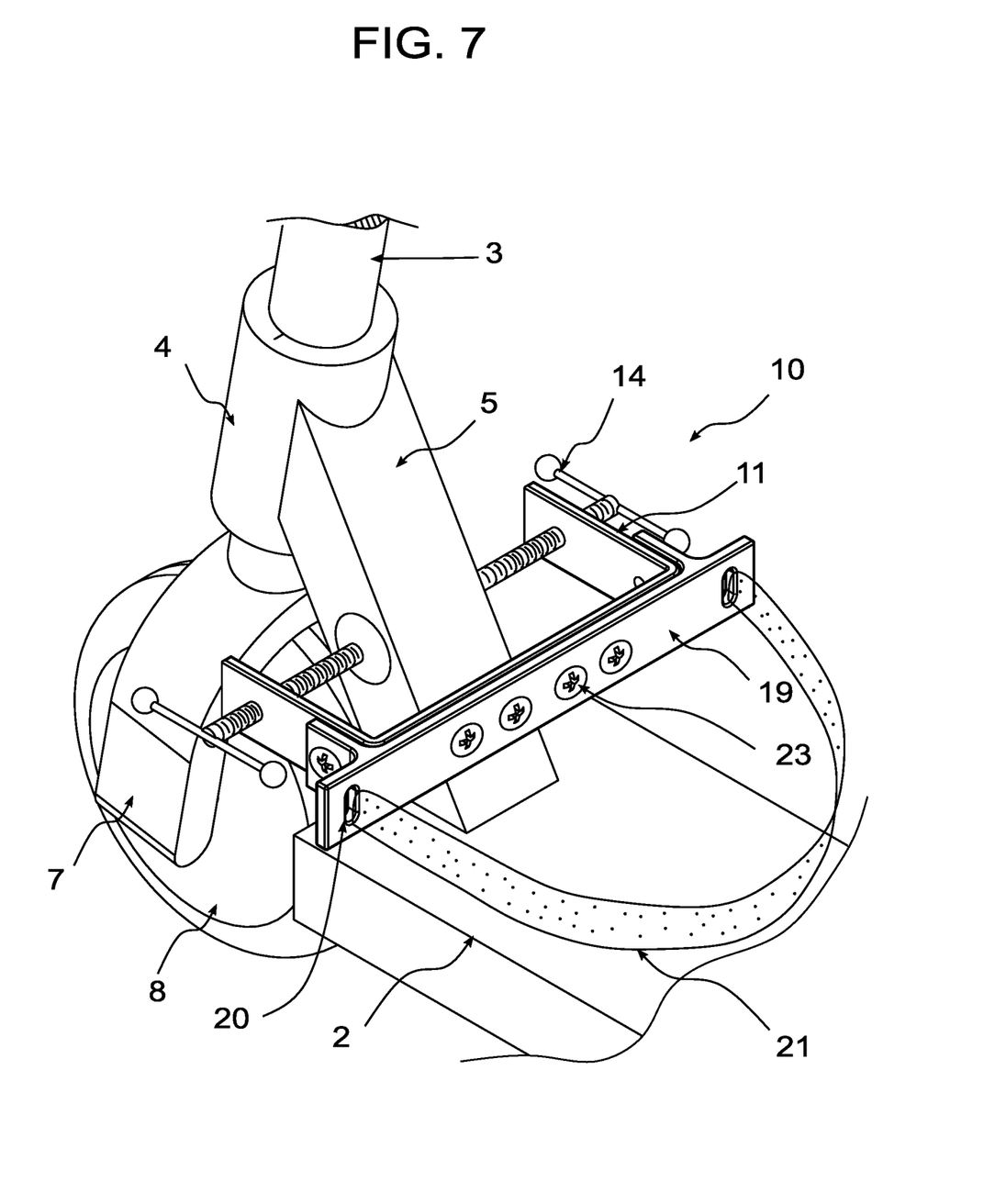
FIG. 7 illustrates a perspective view of a front portion of a scooter having a fourth exemplary embodiment of the cargo securing apparatus according to the disclosure.

FIG. 7 shows a perspective view of a front portion of a scooter 1 having a fourth exemplary embodiment of the cargo securing apparatus 10 according to the disclosure. In this embodiment, a cargo brace 19 is immovably mounted to the mounting body 11 using screw fasteners 23. A strap fastener 21 passes through a plurality of apertures 20 in the cargo brace 19 to secure cargo (not shown) placed on the deck 2 by holding it against the cargo brace 19. The cargo brace 19 can be made of any rigid and tough material, preferably light material such as hard plastic that does not contribute too much to the weight of the cargo securing apparatus 10.

Figure 8:
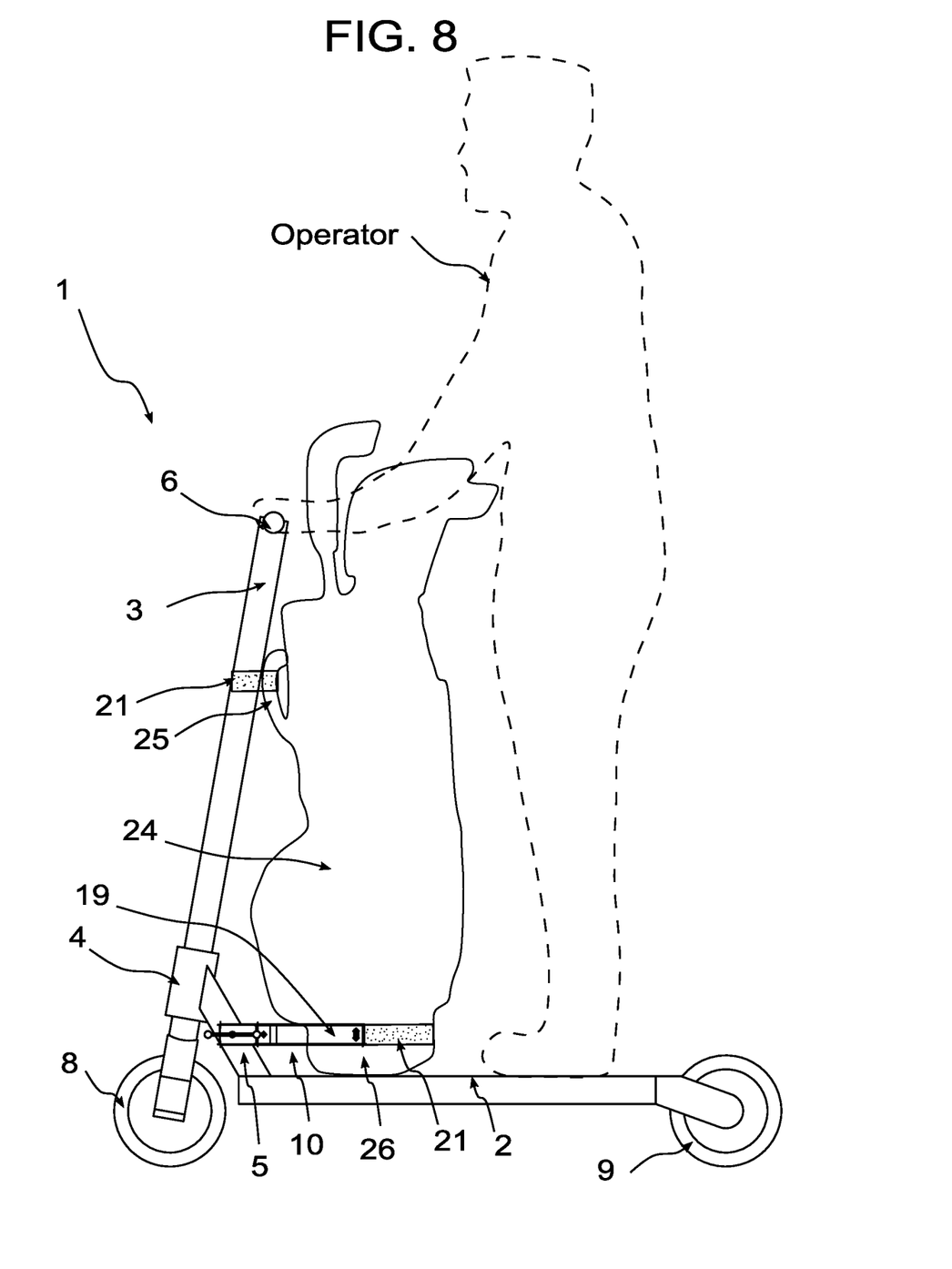
FIG. 8 illustrates an elevation view of a scooter having a fifth exemplary embodiment of the cargo securing apparatus according to the disclosure.

FIG. 8 shows a side elevation view of a scooter 1 having a fifth exemplary embodiment of the cargo securing apparatus 10 according to the disclosure. In this embodiment, the cargo securing apparatus 10 is configured to secure a golf bag 24 having a base 26 and a handle 25. A strap fastener 21 secures the base 26 of the golf bag 24 to the cargo brace 19. A strap fastener 21 is also passed through the handle 25 of the golf bag 24 and around the steering column 3 circumference so as tether the golf bag 24 and keep it in a vertical orientation while the scooter 1 is travelling.

Figure 9:
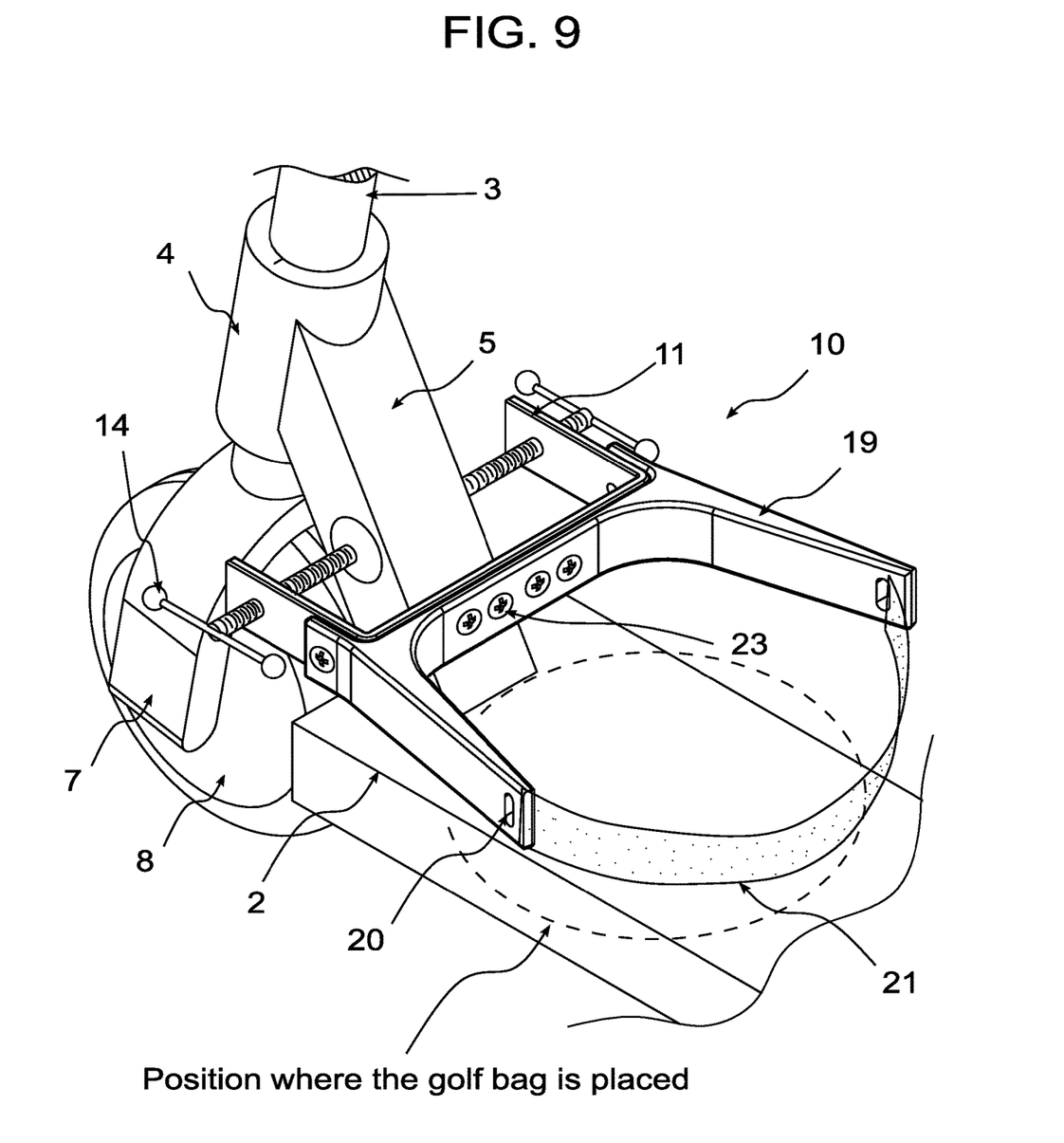
FIG. 9 illustrates a perspective view of a front portion of a scooter having said fifth exemplary embodiment of the cargo securing apparatus according to the disclosure.

FIG. 9 shows a perspective view of a front portion of a scooter 1 having said fifth exemplary embodiment of the cargo securing apparatus 10 according to the disclosure. As golf bags are roughly circular in shape at their base, the cargo brace 19 is shaped with arms that can nestle the base 26 of the golf bag 24 seen in FIG. 8. The cargo brace 19 has a plurality of apertures 20 through which a strap fastener 21 is passed to secure the base 26 of the golf bag 24 to the cargo brace 19.

According to a further advantageous embodiment, the deck 2 and joining column 5 may be one integral part so as to not be non-destructively disconnected.

According to a further advantageous embodiment, the mounting body 11 and cargo brace 19 may be one integral part so as to not be non-destructively disconnected.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any modification, combination or permutation of any of the components, elements, functions, operations, or steps described or illustrated anywhere herein that a person having ordinary skill in the art would comprehend. All such modifications, combinations and permutations are believed to be within the sphere and scope of the invention as defined by the claims appended hereto.

I claim:

1. A cargo securing apparatus for a scooter having a front wheel, a rear wheel, a deck for supporting an operator's feet in a standing position, a steering column, a joining column connecting the deck to the steering column by a steering bearing, comprising:

an at least one mounting body disposed between said front wheel and operator so as to be in front of operator, configured to mount to a stationary member, said stationary member defined as a structural member of the scooter that does not move with the rotation of the steering column or the front or rear wheel, wherein the mounting body is positioned at a location on the stationary member which permits the weight of the cargo to be supported by the deck;

an at least one cargo brace configured to mount, directly or indirectly, to said mounting body, wherein said cargo brace includes a plurality of apertures configured to secure cargo placed on the deck to said cargo brace using fasteners such that the cargo positioned longitudinally rearward of said mounting body and longitudinally forward of the operator is held against the cargo brace when secured.

2. The cargo securing apparatus of claim 1, wherein the mounting body includes one or more apertures configured to receive one or more fasteners.

3. The cargo securing apparatus of claim 1, wherein the mounting body further comprises at least one threaded bore and a threaded rod telescopically received within each threaded bore, said threaded rod oriented substantially parallel to a horizontal plane when said mounting body is mounted to said stationary member.

4. The cargo securing apparatus of claim 1, further comprising a strap fastener configured to tether a handle of a golf bag to said steering column, wherein said cargo brace is shaped to nestle the base of said golf bag.

5. The cargo securing apparatus of claim 1, wherein the cargo securing apparatus is of unitary construction.

6. The cargo securing apparatus of claim 1, wherein the mounting body is substantially U-shaped.

7. The cargo securing apparatus of claim 1, wherein the mounting body is adapted for removeable attachment to a joining column of the scooter, wherein the joining column is disposed between a steering column and a deck of the scooter.

8. A cargo securing apparatus for a scooter having a front wheel, a rear wheel, a deck for supporting an operator's feet in a standing position, a steering column, a joining column connecting the deck to the steering column by a steering bearing, comprising:

an at least one mounting body disposed between said front wheel and operator so as to be in front of operator, configured to mount to a stationary member, said stationary member defined as a structural member of the scooter that does not move with the rotation of the steering column or the front or rear wheel, wherein the mounting body is positioned at a location on the stationary member which permits the weight of the cargo to be supported by the deck;

a basket disposed on the deck longitudinally forward of the operator and longitudinally rearward of the mounting body;

the basket configured to mount, directly or indirectly, to the at least one mounting body;

the basket for receiving cargo.

9. The cargo securing apparatus of claim 8, wherein the mounting body includes one or more apertures configured to receive one or more fasteners.

10. The cargo securing apparatus of claim 8, wherein the mounting body further comprises at least one threaded bore and a threaded rod telescopically received within each threaded bore, said threaded rod oriented substantially parallel to a horizontal plane when said mounting body is mounted to said stationary member.

11. A scooter for carrying cargo and an operator, comprising:
- a front wheel;
- a rear wheel;
- a deck for supporting an operator's feet in a standing position;
- a steering column;
- a joining column connecting the deck to the steering column by a steering bearing;
- an at least one mounting body disposed between said front wheel and operator so as to be in front of operator, configured to mount to a stationary member, said stationary member defined as a structural member of the scooter that does not move with the rotation of the steering column or the front or rear wheel, wherein said mounting body is configured to attach, directly or indirectly, to cargo placed on the deck of the scooter;
- wherein weight of the cargo is supported by the deck;
- wherein cargo is positioned longitudinally rearward of said mounting body and longitudinally forward of the operator.

* * * * *